United States Patent
Cernicek et al.

(10) Patent No.: US 9,565,462 B1
(45) Date of Patent: Feb. 7, 2017

(54) SYSTEM, APPARATUS AND METHOD FOR CREATING, STORING AND TRANSMITTING SENSORY DATA TRIGGERED BY AN EVENT

(71) Applicant: SportXast, LLC, Albuquerque, NM (US)

(72) Inventors: Molly Cernicek, Los Alamos, NM (US); Michael Ham, Los Alamos, NM (US)

(73) Assignee: SportXast, LLC, Albuquerque, NM (US)

( * ) Notice: Subject to any disclaimer, the term of this patent is extended or adjusted under 35 U.S.C. 154(b) by 0 days.

(21) Appl. No.: 14/120,051

(22) Filed: Apr. 18, 2014

Related U.S. Application Data

(60) Provisional application No. 61/854,566, filed on Apr. 26, 2013.

(51) Int. Cl.
*H04N 5/91* (2006.01)
*H04N 21/2747* (2011.01)
*H04N 21/235* (2011.01)

(52) U.S. Cl.
CPC ............ *H04N 21/2747* (2013.01); *H04N 5/91* (2013.01); *H04N 21/2353* (2013.01)

(58) Field of Classification Search
CPC .... H04N 5/76; H04N 21/454; H04N 21/4542; H04N 21/2747; H04N 21/2353; H04N 5/91; G11B 2020/10666
USPC ........................................ 386/241, 248, 261
See application file for complete search history.

(56) References Cited

U.S. PATENT DOCUMENTS

| | | | |
|---|---|---|---|
| 4,605,964 A * | 8/1986 | Chard .................... | H04N 7/088 348/468 |
| 5,367,332 A * | 11/1994 | Kerns .................. | H04N 1/0044 348/231.1 |
| 5,371,795 A * | 12/1994 | Vogel ..................... | H04H 60/33 348/E7.06 |
| 5,996,023 A * | 11/1999 | Winter .............. | G06F 17/30017 348/E5.099 |
| 6,748,481 B1 * | 6/2004 | Parry ..................... | G11B 20/10 375/E7.025 |
| 7,248,632 B1 * | 7/2007 | McKenzie ........... | H04N 19/176 375/240.2 |
| 7,577,199 B1 * | 8/2009 | Herz ...................... | G06T 7/204 348/143 |
| 7,667,731 B2 * | 2/2010 | Kreiner et al. ............... | 348/143 |
| 7,733,371 B1 * | 6/2010 | Monroe ....................... | 348/153 |
| 7,782,363 B2 | 8/2010 | Ortiz | |
| 8,184,169 B2 | 5/2012 | Ortiz | |

(Continued)

FOREIGN PATENT DOCUMENTS

EP 2463855 A1 * 6/2012
JP 2002-112246 A * 4/2002

(Continued)

OTHER PUBLICATIONS

Nagamine et al, Machine generated translations of JP 2004-088481, Mar. 2004.*

*Primary Examiner* — David Harvey
(74) *Attorney, Agent, or Firm* — Jeffrey D. Myers; Justin Roth Muehlmeyer; Peacock Myers, P.C.

(57) ABSTRACT

A method and concomitant computer software and system for buffering data and transmitting the buffered data after an event occurs comprising storing data into a continuous loop buffer and transmitting data from the loop buffer to an end location after an event trigger.

2 Claims, 3 Drawing Sheets

(56) References Cited

U.S. PATENT DOCUMENTS

| | | | |
|---|---|---|---|
| 8,233,042 B2 * | 7/2012 | Jung et al. | 348/143 |
| 8,311,344 B2 | 11/2012 | Dunlop et al. | |
| 8,558,892 B2 * | 10/2013 | Brodsky | G01S 3/7864 |
| | | | 348/155 |
| 8,620,136 B1 * | 12/2013 | Malegaonkar | H04N 5/781 |
| | | | 386/239 |
| 2002/0190852 A1 * | 12/2002 | Lin | B60C 23/0433 |
| | | | 340/445 |
| 2002/0191952 A1 * | 12/2002 | Fiore et al. | 386/46 |
| 2003/0108327 A1 * | 6/2003 | Sunagawa | 386/46 |
| 2003/0192044 A1 * | 10/2003 | Huntsman | H04N 7/162 |
| | | | 725/25 |
| 2003/0235391 A1 * | 12/2003 | Gates et al. | 386/46 |
| 2004/0006767 A1 * | 1/2004 | Robson | H04N 7/0887 |
| | | | 725/28 |
| 2004/0042103 A1 * | 3/2004 | Mayer | G11B 15/026 |
| | | | 360/7 |
| 2004/0052501 A1 * | 3/2004 | Tam | H04N 7/181 |
| | | | 386/240 |
| 2004/0113933 A1 * | 6/2004 | Guler | G06K 9/00771 |
| | | | 715/716 |
| 2005/0078186 A1 * | 4/2005 | Kreiner | G08B 13/19606 |
| | | | 348/152 |
| 2005/0169367 A1 * | 8/2005 | Venetianer et al. | 375/240.01 |
| 2005/0271251 A1 * | 12/2005 | Russell et al. | 382/103 |
| 2007/0124782 A1 * | 5/2007 | Hirai | H04N 5/76 |
| | | | 725/105 |
| 2009/0180025 A1 * | 7/2009 | Dawson | H04N 5/44504 |
| | | | 348/578 |
| 2009/0324058 A1 * | 12/2009 | Sandage | G06K 9/6293 |
| | | | 382/154 |
| 2010/0105484 A1 * | 4/2010 | Horneff | A63F 13/12 |
| | | | 463/43 |
| 2010/0275228 A1 * | 10/2010 | Panje | G11B 27/034 |
| | | | 725/38 |
| 2012/0117221 A1 * | 5/2012 | Katpelly | G11B 20/10527 |
| | | | 709/224 |
| 2013/0222640 A1 * | 8/2013 | Baek et al. | 348/231.99 |
| 2013/0298180 A1 * | 11/2013 | Mountain | G06F 17/30017 |
| | | | 725/151 |

FOREIGN PATENT DOCUMENTS

| | | | |
|---|---|---|---|
| JP | 2004-088481 A | * | 3/2004 |
| JP | 2008-263370 A | * | 10/2008 |

* cited by examiner

SYSTEM, APPARATUS AND METHOD FOR CREATING, STORING AND TRANSMITTING SENSORY DATA TRIGGERED BY AN EVENT

CROSS-REFERENCE TO RELATED APPLICATIONS

This application claims priority to and the benefit of the filing of U.S. Provisional Patent Application Ser. No. 61/854,566, entitled "System, Apparatus and Method for Creating, Storing and Transmitting Sensory Data Triggered by an Event", filed on Apr. 26, 2013, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

A compact disc appendix is included containing computer program code listings pursuant to 37 C.F.R. 1.52(e) and is hereby incorporated by reference in its entirety. The total number of compact discs is 1 including 108 files and 856,447 bytes. The files included on the compact disc are listed in a file entitled "dir_s" on the compact disc. Because of the large number of files contained on the compact disc, the required listing of file names, dates of creation and sizes in bytes is included in the file dir_s on the compact disk and incorporated by reference herein.

COPYRIGHTED MATERIAL

©2013-2014 SportXast.com. A portion of the disclosure of this patent document contains material that is subject to copyright protection. The owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

Field of the Invention (Technical Field)

The present invention relates to the field of sensory recording and transmission. More particularly, a system, apparatus and method whereby sensor data is buffered and then stored or transmitted following a triggering signal.

Description of Related Art

Recent developments in image sensors and mobile recording technology have resulted in a proliferation of sensors and recording systems. For the purpose of this claim, sensory can be thought of, but is not limited to, video, audio or a combination thereof. To capture rare sensory events, such systems must capture the sensor data prior to the event. Therefore, applications either capture more data than necessary through constant recording, or rare events are missed because a capture session was not initiated.

The overarching goal of sensory recording is to capture events that are relevant to the system user. Many such events are missed by recording devices because the most relevant events occur infrequently and unpredictably. For example, the average professional soccer game produces less than one goal for each 30 minutes of play. To capture that soccer goal, a video recording must be started before the goal is scored. Continuously recording devices will capture those rare events, but generate large amounts of data that must be stored and sorted to identify events of interest. In the soccer example, for a viewer who only cares about watching the goals, there would be nearly 30 minutes of game 'noise' for each goal 'signal.' The invention addresses this problem by creating an always-running loop buffer of sensory data that can be accessed after an event of interest occurs, but does not generate excess amounts of data.

BRIEF SUMMARY OF THE INVENTION

A method and concomitant computer software (embodied on a non-transient computer-readable medium) and system for buffering data and transmitting the buffered data after an event occurs, comprising: storing data into a continuous loop buffer; and transmitting data from the loop buffer to an end location after an event trigger. In the preferred embodiment, data is processed to identify content or modify the data for transmission, preferably further comprising one or more of identifying objectionable content and deciding whether to transmit the imagery, compressing the data for storage or transmission, determining where the signal is transmitted, and transmitting object labels to the end location. Data information is recorded or stored and/or embedded within the imagery code. Data can be transmitted to an end user and/or stored after processing. One or more users can trigger an event and/or autonomous capabilities can trigger an event. Data from before an event is typically combined with data that occurs after an event.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

The present invention is of a sensory recording system (including method, apparatus, and software embodied on a non-transitory computer-readable medium) that utilizes a buffer to capture rare events without continuous data storage. After an event is detected, data is transmitted from the buffer to an end location. The system can utilize data processing to understand when a rare event occurs or accept input from a user. The preferred system can deliver data from before and after an event to a storage system.

Figure 1:
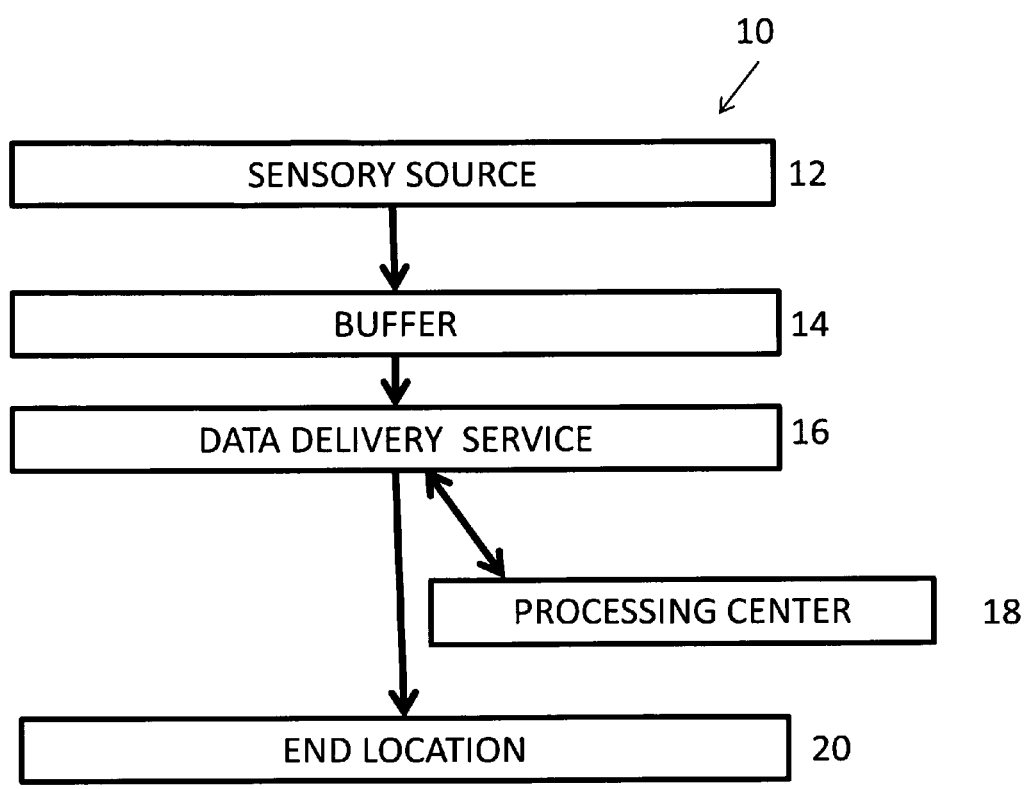
FIG. 1 is a schematic block diagram of one method for creating buffered recordings of live data that can be uploaded following an event.

As seen in FIG. 1, the preferred system 10 may be implemented on a variety of hardware that link sensory sources 12 to an end location 20. During operation, sensor data is continuously fed into a loop buffer 14. The loop buffer 14 stores data that stretches from the present to as far back in the past as the application requires. After an event, the buffered data is delivered through a data delivery system 16 to the end location 20. Optionally, the buffered sensor stream can be sent to 18 for processing before being sent to the end location 20.

In FIG. 1, the imagery source 12 can be, but is not limited to, a live camera stream or a live audio stream.

In FIG. 1, the buffer 14 can record data past the event to show what occurred before and after the event.

In FIG. 1, the data delivery system 16 of system 10 can be, but is not limited to, cable delivered internet, WiMAX, Wifi, infrared, blue tooth, Ethernet, motherboard bus, social networking sites, broadcast television, a satellite, or a cell phone network, or any other network that links the buffered data 14 to the end location 20. Optionally, the data delivery system 16 can link to a processing center 18 and accept data back from 18. Data accepted back from 18 does not have to go through the same network 16 that delivered the data to 18.

In FIG. 1, the processing center 18 of system 10 can be, but is not limited to, graphical processing units, central processing units, field programmable gate arrays, or any suitable hardware or software that can manipulate the imagery in a useful manner. This manner may include, but is not limited to extracting objects, compressing video, processing video for upload, image recognition calculations and output object data. The processing center 18 could apply object recognition algorithms to the image content and identify objects and their location. The processing center 18 can also use algorithms to compress the data for transmission to the end location 20. The system can also incorporate the processing center 18, into the imagery source 12 (not shown) or buffer 14 (not shown). For example, whereby objects could be automatically labeled while data is collected. This storage method for such labels can be, but is not limited to a metadata file or directly added to the video file. Those who are skilled in the state of the art will realize that many options exist for storing objects and their location within data.

In FIG. 1, the end location 20 can include, but is not limited to: cloud storage, local storage, televisions, tablets, smartphones, laptops, servers, and desktop computers. The system can also include a processing center 18, a network, 16, and the end location 20 on a single device (not shown). Those who are skilled in the state of the art will realize that many options exist for storing data. End locations can be established to receive different types of data.

In FIG. 1, the network 16 can function to filter data delivery to the end location 20 based on information from the data processing center 18. For example, content might not be delivered to the end location 20 if imagery in the buffer 14 contains objectionable or illegal content. The processing center 18 can function to decide which end location 20 should receive the imagery source. For example if the sensory imagery pertains to sports, the data could be delivered to a website that specializes in sports.

Figure 2:
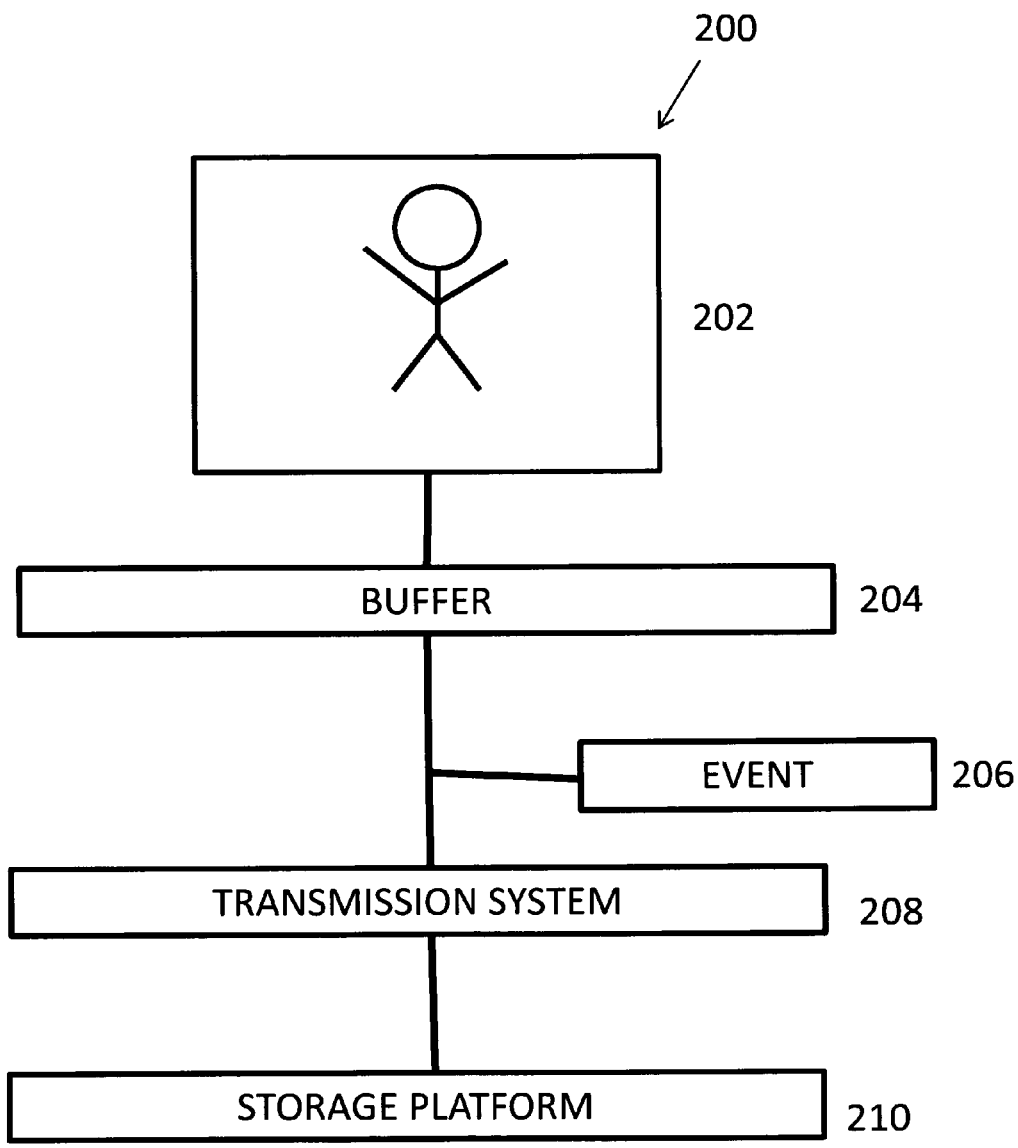
FIG. 2 depicts a preferred embodiment of the invention.

In FIG. 2, a preferred implementation method 200 can include an example implementation. The preferred implementation 200 depicts a process, whereby a video stream 202 is buffered in real time in 204. Depending on the application, the buffer may hold several seconds of video or several hours. In the preferred implementation, an event 206, triggers the buffered video 204 to be transmitted by 208 to a storage platform 210.

In FIG. 2 the buffer 204 can consist of, but is not limited to random access memory or a hard drive.

In FIG. 2, the event 206 can include, but is not limited to a user pressing a button or an automated sensor sending a signal. Those skilled in the state of the art will recognize that many options exist to create an event trigger.

In FIG. 2, the transmission system 208 can be, but is not limited to, cable delivered internet, cell phone network, WiMAX, wireless (WiFi), infrared, blue tooth, Ethernet, motherboard bus, or any other network that links the buffered imagery 204 to the end location 210. Optionally, the transmission system 208 can link to a processing center (not shown).

The storage platform 210 can be, but is not limited to a tablet computer, mobile web platforms, web servers, cell phone or a personal computer.

Figure 3:
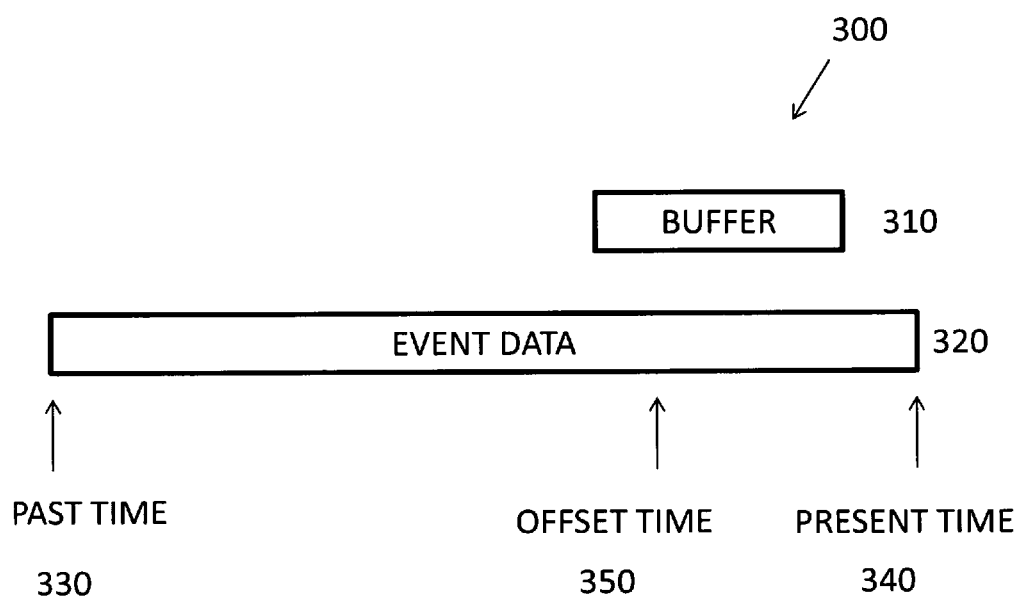
FIG. 3 is a schematic depicting the loop buffer.

In FIG. 3, an example implementation of the loop buffer 300 is depicted.

In FIG. 3, a data event 320 stretches from the past time 330 to the present time 340. Data events can be from, but are not limited to, cameras and microphones.

In FIG. 3, a buffer 310 stretches backwards from the present time 340 to an offset time 350. For example, the buffer could stretch back 8 s, making 8 s the offset time 350. If the offset time stretched back 8 s, the end result would be a buffer that always stores data ranging from 8 s in the past to the present. An event trigger, not shown, can be used to save this buffered data when an event of interest occurs. The offset time 350 can be fixed or variable depending on user needs.

As a person skilled in the art will recognize from the previous detailed description and from the figures and claims, modifications and changes can be made to the preferred embodiments of the invention without departing from the scope of this invention defined in the following claims. The invention is further described in the material incorporated by reference on compact disc.

In the preferred embodiment, and as readily understood by one of ordinary skill in the art, the apparatus according to the invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for buffering data obtained from a sensor and transmitting the buffered data after an event occurs, comprising the steps of:
   obtaining data from a sensor;
   storing the data into a continuous loop buffer;
   processing the data to create data information by identifying objects and their location in the data, labeling the objects, and storing or embedding the data information within the data;
   triggering an event by a user or by autonomous capabilities;
   combining data from before the event with data that occurs after the event in a manner that is predetermined or determined by the user;
   modifying or compressing the processed data and data information for storage or transmission;
   storing the processed data and data information;
   automatically identifying objectionable content in the processed data and data information to decide whether to transmit the data and data information;
   determining where the processed data and data information is to be transmitted; and
   transmitting the processed data and data information to an end location.

2. A non-transitory computer-readable medium comprising software to buffer data and transmit the buffered data after an event occurs, the software comprising:
   code storing data obtained from a sensor into a continuous loop buffer;
   code processing the data to create data information by identifying objects and their location in the data, labeling the objects, and storing or embedding the data information within the data;
   code triggering an event by a user or by autonomous capabilities;
   code processing the data after an event is triggered to combine data from before the event with data that occurs after the event in a manner that is predetermined or determined by the user;
   code modifying or compressing the processed data and data information for storage or transmission;
   code storing the processed data and data information;
   code automatically identifying objectionable content in the processed data and data information to decide whether to transmit the data and data information;
   code determining where the processed data and data information is to be transmitted; and
   code transmitting the processed data and data information to an end location.

* * * * *